US011913260B2

(12) United States Patent
Deng et al.

(10) Patent No.: US 11,913,260 B2
(45) Date of Patent: Feb. 27, 2024

(54) LOCKING MECHANISM FOR SLIDABLE VEHICLE DOORS

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 434 days.

(21) Appl. No.: 17/373,419

(22) Filed: Jul. 12, 2021

(65) Prior Publication Data

US 2023/0012096 A1    Jan. 12, 2023

(51) Int. Cl.
*E05B 77/48* (2014.01)
*E05B 81/04* (2014.01)
*E05B 81/16* (2014.01)
*B60J 5/04* (2006.01)

(52) U.S. Cl.
CPC .............. *E05B 77/48* (2013.01); *B60J 5/0479* (2013.01); *E05B 81/04* (2013.01); *E05B 81/16* (2013.01); *E05Y 2900/531* (2013.01)

(58) Field of Classification Search
CPC ....... B60J 5/0477; B60J 5/0479; E05B 77/48; E05B 81/16; E05B 81/18; E05B 83/12; E05B 83/20; E05B 83/38; E05B 83/40; E05B 85/26
See application file for complete search history.

(56) References Cited

U.S. PATENT DOCUMENTS

| 1,869,274 A | 7/1932 | Phillips |
| 6,694,676 B2 | 2/2004 | Sakamoto et al. |
| 7,059,654 B2 * | 6/2006 | Ichinose ................. E05B 81/22 296/202 |
| 7,819,465 B2 | 10/2010 | Elliott et al. |
| 8,267,464 B2 | 9/2012 | Konchan et al. |
| 9,168,884 B2 | 10/2015 | Horner |

(Continued)

FOREIGN PATENT DOCUMENTS

| DE | 102008005490 A1 * | 7/2009 | ............ B60J 5/0479 |
| EP | 3231970 A1 * | 10/2017 | ........... E05B 63/143 |

(Continued)

*Primary Examiner* — Barry Gooden, Jr.
(74) *Attorney, Agent, or Firm* — Frank A. MacKenzie; Bejin Bieneman PLC

(57) ABSTRACT

An assembly for a vehicle includes a first door and a second door moveable from an open position to a closed position. The assembly includes a first locking member supported by the first door moveable along a first axis to a raised position and to a lowered position. The assembly includes a second locking member supported by the second door movable along a second axis transverse to the first axis. The first locking member is lockingly engaged with the second locking member when the second locking member is in the extended position and the first locking member is in one of the lowered position or the raised position. The first locking member is disengaged with the second locking member when the second locking member is in the retracted position and the first locking member is in the other of the lowered position or the raised position.

13 Claims, 9 Drawing Sheets

(56) References Cited

U.S. PATENT DOCUMENTS

| | | |
|---|---|---|
| 9,475,368 B2 | 10/2016 | Choi |
| 9,688,312 B2 | 6/2017 | Maeshiro et al. |
| 10,106,206 B1 | 10/2018 | Baccouche et al. |
| 10,384,519 B1 | 8/2019 | Brown et al. |
| 10,526,817 B2 | 1/2020 | Gray et al. |
| 10,780,844 B2* | 9/2020 | Doan .................. F16B 2/22 |
| 11,525,291 B2* | 12/2022 | Salter .................. E05B 81/06 |
| 2004/0201245 A1* | 10/2004 | Ichinose ............... E05B 77/02 |
| | | 296/146.1 |
| 2009/0224569 A1* | 9/2009 | Lagrut ................. B60J 5/0479 |
| | | 296/146.1 |
| 2011/0221229 A1 | 9/2011 | Rouhana et al. |
| 2012/0023830 A1 | 2/2012 | Bazzi et al. |
| 2012/0049580 A1* | 3/2012 | Konchan ............... E05B 81/18 |
| | | 296/202 |
| 2019/0100247 A1 | 4/2019 | Nusier et al. |
| 2020/0283069 A1 | 9/2020 | Choi et al. |
| 2021/0372173 A1* | 12/2021 | Okeke .................. E05B 85/04 |

FOREIGN PATENT DOCUMENTS

| | | | |
|---|---|---|---|
| EP | 4257386 A1 * | 10/2023 | ............ B60J 5/0458 |
| GB | 2494621 A * | 3/2013 | ............ E05B 47/00 |
| GB | 2579383 A | 11/2018 | |
| JP | 4019010 B2 | 12/2007 | |
| KR | 20110032950 A | 3/2011 | |
| WO | 2020108859 A1 | 6/2020 | |
| WO | WO-2020108852 A1 * | 6/2020 | ................ B60J 5/04 |
| WO | WO-2020108854 A1 * | 6/2020 | ............ B60J 5/0443 |
| WO | WO-2020109493 A1 * | 6/2020 | ................ B60J 5/04 |

* cited by examiner

LOCKING MECHANISM FOR SLIDABLE VEHICLE DOORS

BACKGROUND

A vehicle may include amenities that allow occupants ingress and egress of the vehicle. For example, a vehicle may not include a B-pillar to allow more space for occupants to ingress and egress the vehicle. Specifically, such vehicles may include two doors that meet at the location traditionally occupied by the B-pillar when in a closed position. The door may be rotatable about the A-pillar and the C-pillar, respectively, such that the doors rotate away from each other to an open position.

DETAILED DESCRIPTION

Figure 1:
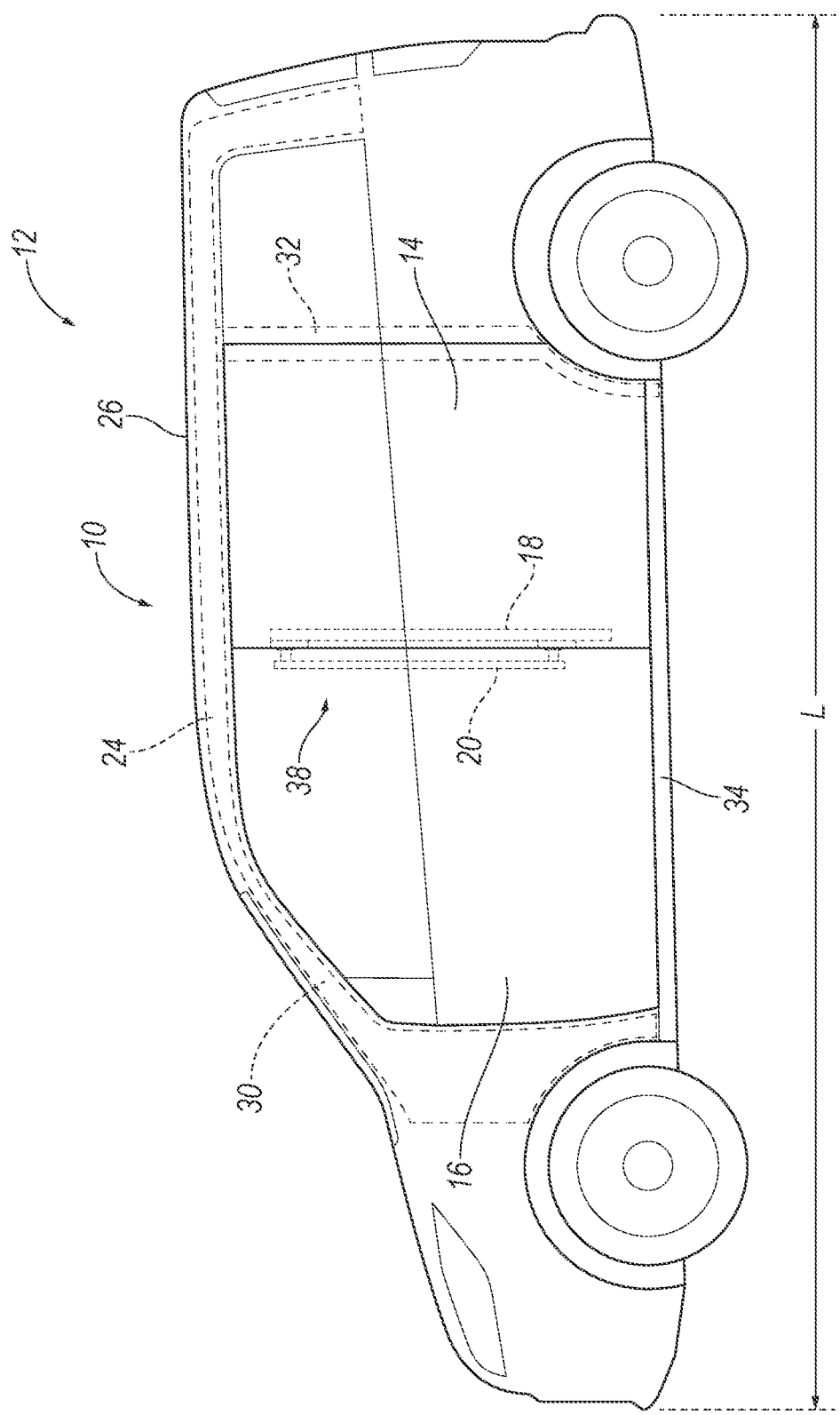
FIG. 1 is a side view of a vehicle having doors in a closed position and a locking mechanism supported by the doors.

An assembly includes a first door and a second door moveable relative to each other from an open position to a closed position. The assembly includes a first locking member supported by the first door. The first locking member is moveable relative to the first door along a first axis in an upward direction to a raised position and in a downward direction relative to the first door to a lowered position. The assembly includes a second locking member supported by the second door. The second locking member is movable relative to the second door along a second axis transverse to the first axis between a retracted position and extended position. The first locking member is lockingly engaged with the second locking member when the second locking member is in the extended position and the first locking member is in one of the lowered position or the raised position. The first locking member is disengaged with the second locking member when the second locking member is in the retracted position and the first locking member is in the other of the lowered position or the raised position.

The first locking member may include a first female portion, the second locking member may include a first male portion, and the first female portion may be lockingly engaged with the first male portion when the second locking member is in the extended position and the first locking member is in the one of the lowered position or the raised position, the first female portion being disengaged with the first male portion when the second locking member is in the retracted position and the first locking member is in the other of the lowered position or the raised position.

The first locking member may include a second female portion spaced from the first female portion along the first axis, the second locking member may include a second male portion spaced from the male portion along the first axis, and the second female portion may be lockingly engaged with the second male portion when the second locking member is in the extended position and the first locking member is in the one of the lowered position or the raised position, the second female portion being disengaged with the second male portion when the second locking member is in the retracted position and the first locking member is in the other of the lowered position or the raised position.

The first female portion and the second female portion may move together as a unit.

The first male portion and the second male portion may move together as a unit.

The first door and the second door may each define a midline extending along a vehicle-longitudinal axis, the first female portion being spaced upwardly from the midlines and the second female portion being spaced downwardly from the midlines.

The first locking member may include a rod elongated along the first axis, the first female portion and the second female portion may be fixed to the rod of the first locking member.

The second locking member may include a rod elongated along the first axis, the first male portion and the second male portion may be fixed to the rod of the second locking member.

The first locking member may include a female portion and the second locking member includes a male portion, the female portion and the male portion being lockingly engaged when the second locking member is in the extended position and the first locking member is in the one of the lowered position or the raised position, the female portion and the male portion being disengaged when the second locking member is in the retracted position and the first locking member is in the other of the lowered position or the raised position.

The first door and the second door may be slidable between the open position and the closed position.

The first locking member and the second locking member may be spaced from each other along a vehicle-longitudinal axis when the first door and the second door are in the open position and the first locking member and the second locking member are adjacent each other when the first door and the second door are in the closed position.

The first axis may be generally vertical and the second axis is generally horizontal.

The assembly may include a first motor operatively connected to the first locking member to move the first locking member between the lowered position and the raised position, and a second motor operatively connected to the second locking member to move the second locking member between the retracted position and the extended position.

With reference to the Figures, wherein like numerals indicate like parts throughout the several views, an assembly 10 for a vehicle 12 includes a first door 14 and a second door 16 moveable relative to each other from an open position to a closed position. The assembly 10 includes a first locking member 18 supported by the first door 14. The first locking member 18 is moveable relative to the first door 14 along a first axis A in an upward direction to a raised position and in a downward direction relative to the first door 14 to a lowered position. The assembly 10 includes a second locking member 20 supported by the second door 16. The second locking member 20 is movable relative to the second door 16 along a second axis B transverse to the first axis A between a retracted position and extended position. The first locking member 18 is lockingly engaged with the second locking member 20 when the second locking member 20 is in the extended position and the first locking member 18 is in one of the lowered position or the raised position. The first locking member 18 is disengaged with the second locking member 20 when the second locking member 20 is in the retracted position and the first locking member 18 is in the other of the lowered position or the raised position.

Since the first locking member 18 lockingly engages with the second locking member 20, the locking members 18, 20 may provide structural reinforcement to the vehicle 12. Specifically, in the event of certain side impacts, the locking members 18, 20 may limit intrusion into the vehicle 12 by the side impact. In one example, such as the example shown in the Figures, the vehicle 12 may include no middle pillar between a front pillar 30 and a rear pillar 32 and the first door 14 and the second door 16 may receive the impact in certain side impacts. In such an example, the locking members 18, 20 reinforce the area between the front pillar 30 and the rear pillar 32, e.g., by reducing relative movement between the first door 14 and the second door 16 to reduce the likelihood of intrusion during certain side impacts by maintaining the first door 14 and the second door 16 in the closed position.

Figure 2:
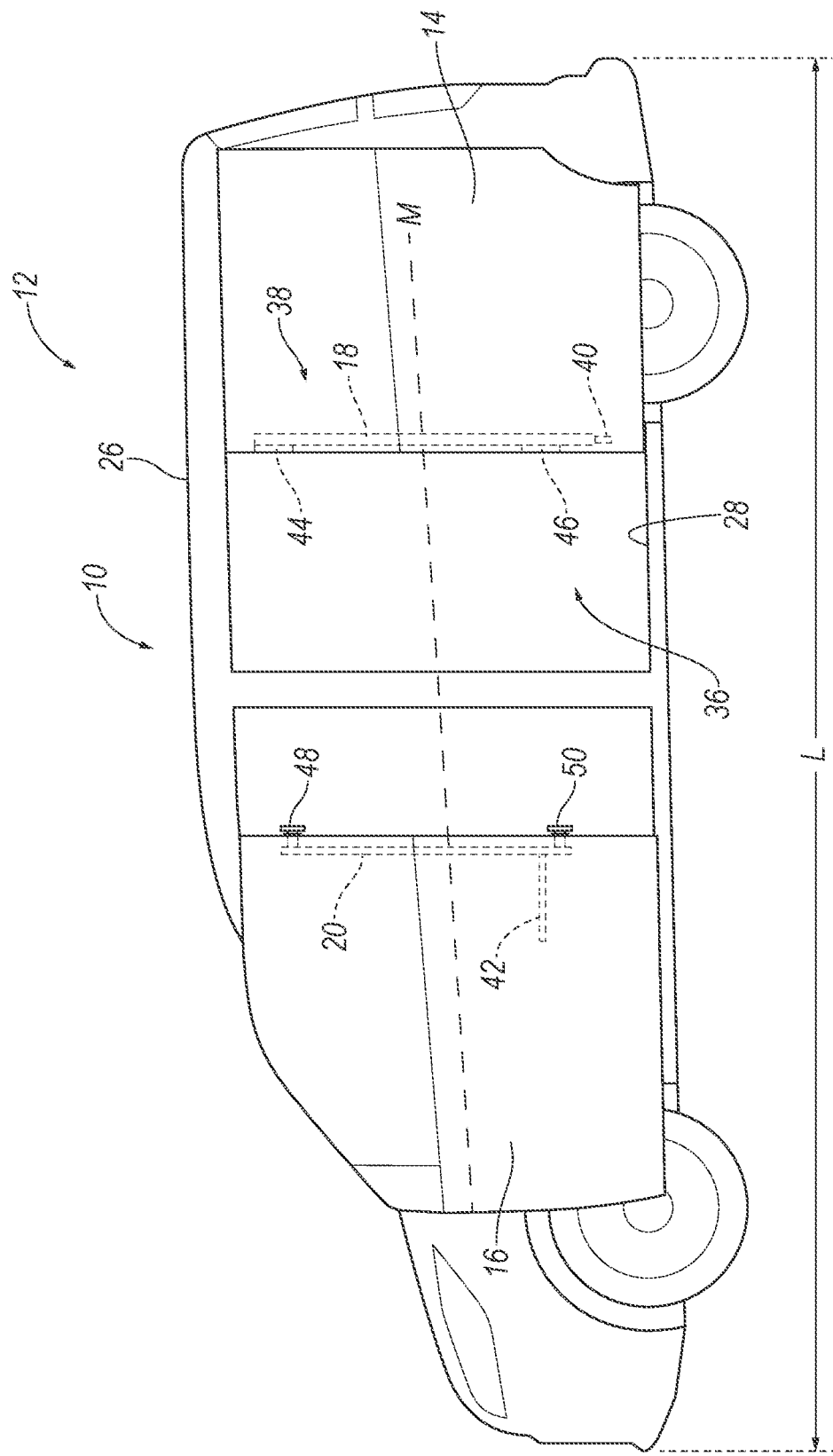
FIG. 2 is a side view of the vehicle having doors in an open position and the locking mechanism supported by the doors.

With reference to FIGS. 1 and 2, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a vehicle frame (not numbered) and the vehicle body 22. The vehicle frame and the vehicle body 22 may be of a unibody construction in which the frame is unitary with a vehicle body 22 (including frame rails, pillars 30, 32, roof rails 24, etc.). As another example, the vehicle body 22 and vehicle frame may have a body-on-frame construction (also referred to as a cab-on-frame construction) in which the vehicle body 22 and frame are separate components, i.e., are modular, and the vehicle body 22 is supported on and affixed to the frame. Alternatively, the vehicle frame and vehicle body 22 may have any suitable construction. The vehicle frame and vehicle body 22 may be of any suitable material, for example, steel, aluminum, and/or fiber-reinforced plastic, etc.

The vehicle body 22 may define a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle body 22 includes two roof rails 24. The roof rails 24 are spaced from one another in a cross-vehicle direction. The roof rails 24 each extend longitudinally along the vehicle body 22, i.e., along a vehicle-longitudinal axis L.

The vehicle body 22 includes one or more roof bows (not shown) extending between the roof rails 24. The roof bows are spaced from one another in a vehicle fore-and-aft direction. The roof bows extend from one roof rail 24 to the other roof rail 24. Both roof bows may be irremovably fixed to both roof rails 24. In other words, the roof bows are secured to the roof rails 24 in such a way that removal requires destruction such as cutting, e.g., cutting material and/or welded joints, etc. As an example, the roof bows may be attached to both roof rails 24, e.g., by welding, fasteners, etc. The vehicle body 22 may include any suitable roof bows spaced from one another and extending from one roof rail 24 to the other roof rail 24.

The vehicle body 22 includes a roof 26. The roof 26 may define the upper boundary of the passenger compartment and may extend from the front end of the passenger compartment to the rear end of the passenger compartment. The roof 26 may extend from one roof rail 24 to the other roof rail 24. The roof 26 may be irremovably fixed to the roof rails 24. In other words, the roof 26 is secured to the roof 26 fails in such a way that removal requires destruction such as cutting, e.g., cutting material and/or welded joints, etc. As an example, the roof 26 may be attached to both roof rails 24, e.g., by welding, fasteners, etc., and may be supported by the roof bows.

With continued reference to FIGS. 1 and 2, the vehicle body 22 includes the floor 28 spaced downwardly from the roof 26. The floor 28 may define the lower boundary of the passenger compartment and may extend from the front end of the passenger compartment to the rear end of the passenger compartment. The floor 28 may include a floor 28 panel and upholstery on the floor 28. The upholstery may be, for example, carpet, and may have a class-A surface facing the passenger compartment, i.e., a surface specifically manufactured to have a high quality, finished, aesthetic appearance free of blemishes. The floor 28 may include crossbeams (not shown) connected to the floor 28 panel and to other components of the vehicle body 22.

The vehicle body 22 may include pillars 30, 32, spaced from each along the vehicle-longitudinal axis L on both sides of the vehicle body 22. Specifically, the vehicle body 22 includes a front pillar 30, e.g., an A-pillar, and a rear pillar 32 (which may be referred to as a C-pillar even in examples in which there is no B-pillar) spaced vehicle-rearward from the front pillar 30 on each side of the vehicle body 22. For example, the vehicle body 22 includes a front pillar 30 and a rear pillar 32 on each side of the vehicle 12 with the front pillar 30 being spaced from the rear pillar 32. In other words, the front pillar 30 may be disposed at the front end of the passenger compartment. The pillars 30, 32 may extend from the roof 26 to the floor 28. The vehicle 12 may include other pillars in addition to the front pillar 30 and rear pillar 32. For example, as shown in the Figures, the vehicle 12 may include a D-pillar disposed at the rear end of the passenger compartment on each side of the vehicle 12.

The vehicle body 22 includes rockers 34 extending from the front pillar 30 to the rear pillar 32, e.g., from the front pillar 30 to the rear pillar 32. Specifically, the vehicle body 22 may include two rockers 34, one on each side of the vehicle body 22. The rockers 34 are elongated along the vehicle-longitudinal axis L. The vehicle 12 may include two rockers 34, i.e., one rocker 34 on either side of the passenger compartment. The rockers 34 are spaced from the roof rails 24 below the roof rails 24. The rockers 34 are below the passenger compartment. In some examples, the rockers 34 may be connected to the pillars 30, 32, in any suitable way, e.g., welding, adhesive, fasteners, etc. In other words, in such examples, the rockers 34 and the pillars 30, 32, are separate from each other and connected to each other. In other examples, the rockers 34 may be unitary with the pillars 30, 32, i.e., a single, uniform piece of material with no seams, joints, fasteners, or adhesives holding it together. In such an example, the pillars 30, 32, and the rocker 34 may be formed together simultaneously as a single continuous unit, e.g., by molding, forging, casting, stamping, etc.

As shown in FIG. 2, the vehicle body 22 may define a door opening 36. Specifically, the vehicle body 22 may include one or more door opening 36 between pillars 30, 32, of the vehicle body 22. The door opening 36 may be between the front pillar 30 and the rear pillar 32, e.g., between the front pillar 30 and the rear pillar 32, and between the rocker 34 and the roof rail 24. In other words, the pillars 30, 32, are spaced from each other by the door opening 36 and the roof rail 24 and rocker 34 are spaced from each other by the door opening 36. The door opening 36 extends uninterrupted from the front pillar 30 to the rear pillar 32. The door opening 36 extends uninterrupted from the rocker 34 to the roof rails 24. The door opening 36 allows for ingress and egress into the passenger compartment. The vehicle 12 may include any suitable number of door openings 36 to allow for ingress and egress into the passenger compartment. For example, as shown in the Figures, the vehicle 12 may include a door opening 36 on each side of the vehicle 12. In other examples, the vehicle 12 may include multiple door openings 36 on each side of the vehicle 12.

With reference to FIGS. 1-3B, the vehicle body 22 may not include a middle pillar between the front pillar 30 and the rear pillar 32, i.e., the vehicle body 22 may not include a middle pillar, e.g., a B-pillar, between the front pillar 30 and the rear pillar 32 from the floor 28 to the roof 26. In other words, the vehicle body 22 is B-pillarless. The vehicle body 22 lacking a middle pillar allows for the door opening 36 to extend from the front pillar 30 to the rear pillar 32. The door opening 36 extending from the front pillar 30 to the rear pillar 32 allows occupants easier access to the passenger compartment for ingress and egress.

The vehicle 12 may include one or more seats. Specifically, the vehicle 12 may include any suitable number of seats. The seats are supported by the floor 28. The seats may be arranged in any suitable arrangement in the passenger compartment. As in the example shown in the Figures, one or more of the seats may be at the front end of the passenger compartment, e.g., a driver seat and/or a passenger seat. In other examples, one or more of the seats may be behind the front end of the passenger compartment, e.g., at the rear end of the passenger compartment. The seats may be movable relative to the floor 28 to various positions, e.g., movable fore-and-aft and/or cross-vehicle. The seat may be of any suitable type, e.g., a bucket seat. The seats may be adjacent the door openings 36 in the vehicle body 22.

With reference to FIGS. 1 and 2, the vehicle 12 includes a plurality of doors 14, 16, e.g., a first door 14 and a second door 16 on each side of the vehicle body 22, movable relative to each other from an open position to a closed position for vehicle 12 occupants to enter and exit the passenger compartment. The first door 14 may be a rear door of the vehicle 12 and the second door 16 may be a front door of the vehicle 12. In the closed position, the doors 14, 16 are in at least one of the door openings 36 in the vehicle body 22. In the example shown in the Figures, the first door 14 and the second door 16 are both in the single door opening 36 in the vehicle body 22 on the side of the vehicle 12. In the open position, at least one of the door openings 36 in the vehicle body 22 may be exposed. Each of the doors 14, 16 are adjacent a seat in the vehicle 12. Each of the front seats and each of the rear seats may be adjacent a door 14, 16 of the vehicle 12. The doors 14, 16 are vehicle-outboard from each of the front seats and each of the rear seats.

The numerical adverbs "first" and "second" with respect to the doors 14, 16, are used herein merely as identifiers and do not signify order or importance. The terms "first" and "second" may be used interchangeably when referring to the doors 14, 16 as shown in the Figures.

The first door 14 and the second door 16 each define a midline M extending along a vehicle-longitudinal axis L. The midlines M are spaced equidistantly from the top and the bottom of the first door 14 and the second door 16.

As shown in the example in the Figures, the doors 14, 16 are slidable between the open position and the closed position. For example, the vehicle body 22 may include a track with the doors 14, 16 being slidably supported by the track. Each of the doors 14, 16 is movable, i.e., slidable, from the closed position to the open position. In the closed position, the doors 14, 16 on each side of the vehicle 12, i.e., the first door 14 and the second door 16 on each side of the vehicle 12, are adjacent each other. As the doors 14, 16 move to the open position, the first door 14 moves away from the second door 16 and toward the front end of the passenger compartment and the second door 16 moves away from the first door 14 toward the rear end of the passenger compartment.

The roof rails 24 contact a top edge of the doors 14, 16 when the doors 14, 16 are in the closed position. The doors 14, 16 includes at least one door panel (not numbered) and a door-trim panel (not shown) supported on the door panel. Specifically, the doors 14, 16 may include two panels, namely a door inner (not shown) and a door outer (not numbered). In such an example, the door-trim panel and the door outer are fixed to the door inner. The door-trim panel is positioned opposite the door outer relative to the door frame. The door-trim panel is inboard relative to the door inner, and the door outer is outboard relative to the door inner. The doors 14, 16 include a window opening (not numbered) that may be completely closed by a window (not numbered) when the window is in a fully raised position. The window door opening 36 is defined by the door-trim panel and door outer on a bottom edge and either by the door inner circumscribing the window door opening 36 or by the vehicle body 22, e.g., the front pillar 30, the B-pillar, and the roof rail 24. The door outer faces outboard relative to the vehicle 12.

The door outer may define a portion of the exterior of the vehicle 12. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door.

As shown in FIGS. 1-6B, the assembly 10 includes a locking mechanism 38 supported by the doors 14, 16 on each side of the vehicle 12. The locking mechanism 38 lockingly engages the first door 14 and the second door 16 together to provide structural reinforcement to the vehicle body 22 in case of an impact to the vehicle 12, e.g., certain side impacts. The locking mechanism 38 may maintain the first door 14 and the second door 16 in the closed position in case of certain side impacts and limit intrusion into the vehicle 12 in case of a side impact. The locking mechanism 38 reinforces the area between the front pillar 30 and the rear pillar 32 to reduce intrusion during certain side impacts by maintaining the first door 14 and the second door 16 in the closed position.

The locking mechanism 38 includes the first locking member 18 and the second locking member 20. The first locking member 18 is supported by the first door 14 and the second locking member 20 is supported by the second door 16. The first locking member 18 may be between the door inner and the door outer of the first door 14 and the second locking member 20 may be between the door inner and the door outer of the second door 16. The first locking member 18 is lockingly engaged with the second locking member 20 when the first door 14 and the second door 16 are in the closed position. Specifically, the first locking member 18 and the second locking member 20 are adjacent each other when the doors 14, 16 are in the open position. The first locking member 18 is disengaged with the second locking member 20 when the first door 14 and the second door 16 are in the open position. Specifically, the first locking member 18 and the second locking member 20 are spaced from each other along a vehicle-longitudinal axis L when the doors 14, 16 are in the closed position. In such a position, the door opening 36 in the vehicle body 22, or at least a portion of the door opening 36, is between the first locking member 18 and the second locking member 20. Spaced "Along" an axis is used throughout this disclosure to refer to components that on the axis or off the axis with spacing between the components measured on the axis.

As shown in FIGS. 3A-6B, the first locking member 18 is movable from a raised position to a lowered position. The first locking member 18 is lockingly engaged with the second locking member 20 when the first locking member 18 is in one of the lowered position or the raised position and the first locking member 18 is disengaged with the second locking member 20 when the first locking member 18 is in the other of the lowered position or the raised position. When the first locking member 18 is lockingly engaged with the second locking member 20, the doors 14, 16 are locked to each other and immoveable relative to each other. In the examples shown in the Figures, the first locking member 18 is lockingly engaged with the second locking member 20 when the first locking member 18 is in the lowered position and the first locking member 18 is disengaged with the second locking member 20 when the first locking member 18 is in the raised position. In other examples, the first locking member 18 is lockingly engaged with the second locking member 20 when the first locking member 18 is in the raised position and the first locking member 18 is disengaged with the second locking member 20 when the first locking member 18 is in the lowered position. The first locking member 18 is moveable along the first axis A in an upward direction and in a downward direction relative to the first door 14. Specifically, the first locking member 18 moves in the upward direction to reach the raised position and the first locking member 18 moves in the downward direction to reach the lowered position. As an example, the first axis A may be generally vertical. In such an example, the first locking member 18 moves generally vertically in the upward direction and in the downward direction relative to the door 14 between raised position and the lowered position.

Figures 3A, 3B:
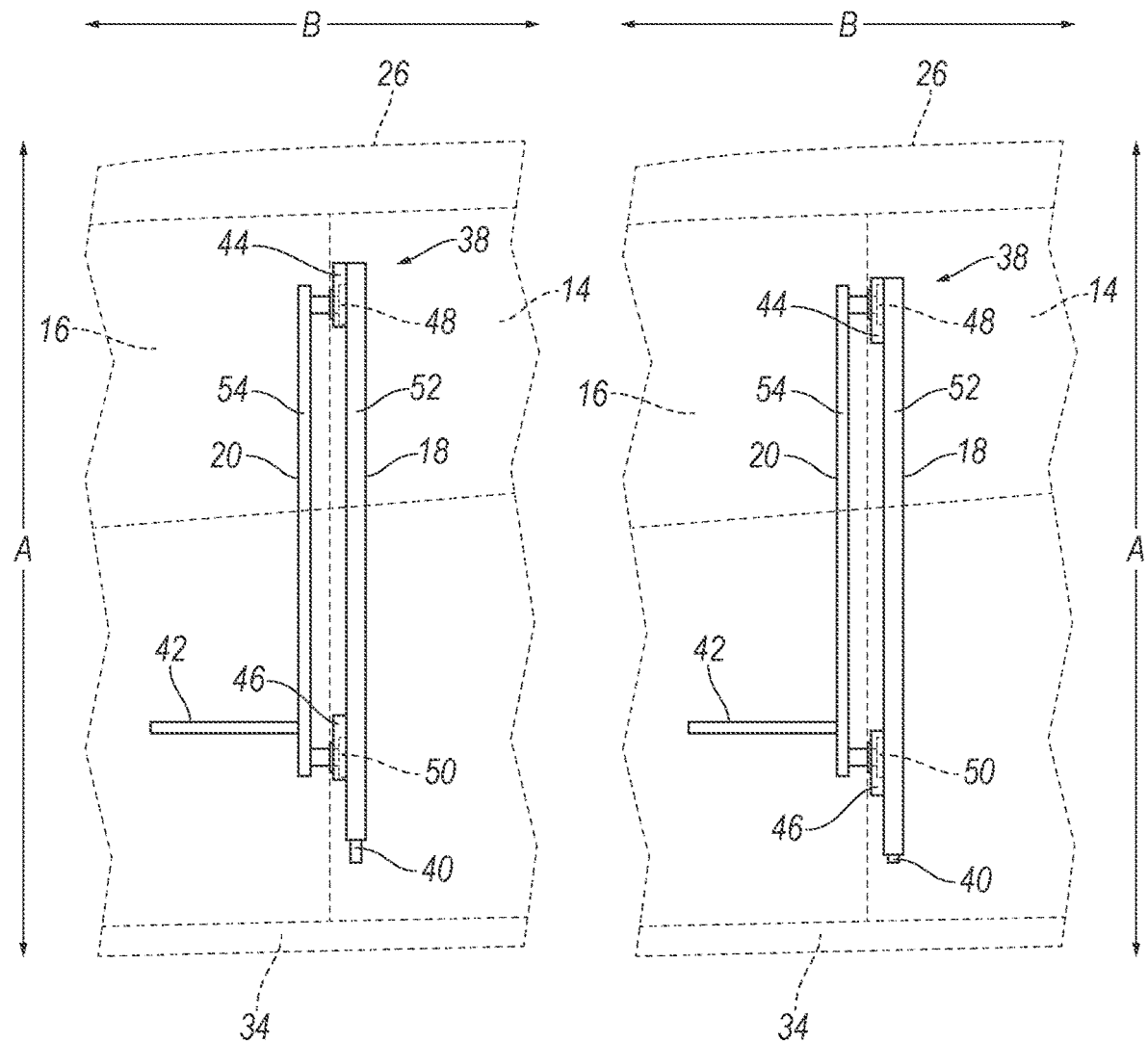
FIG. 3A is a side view of the locking mechanism having a first locking member in a raised position and a second locking member in an extending position.
FIG. 3B is a side view of the locking mechanism having the first locking member in a lowered position and the second locking member in the extended position.
Figure 4B:
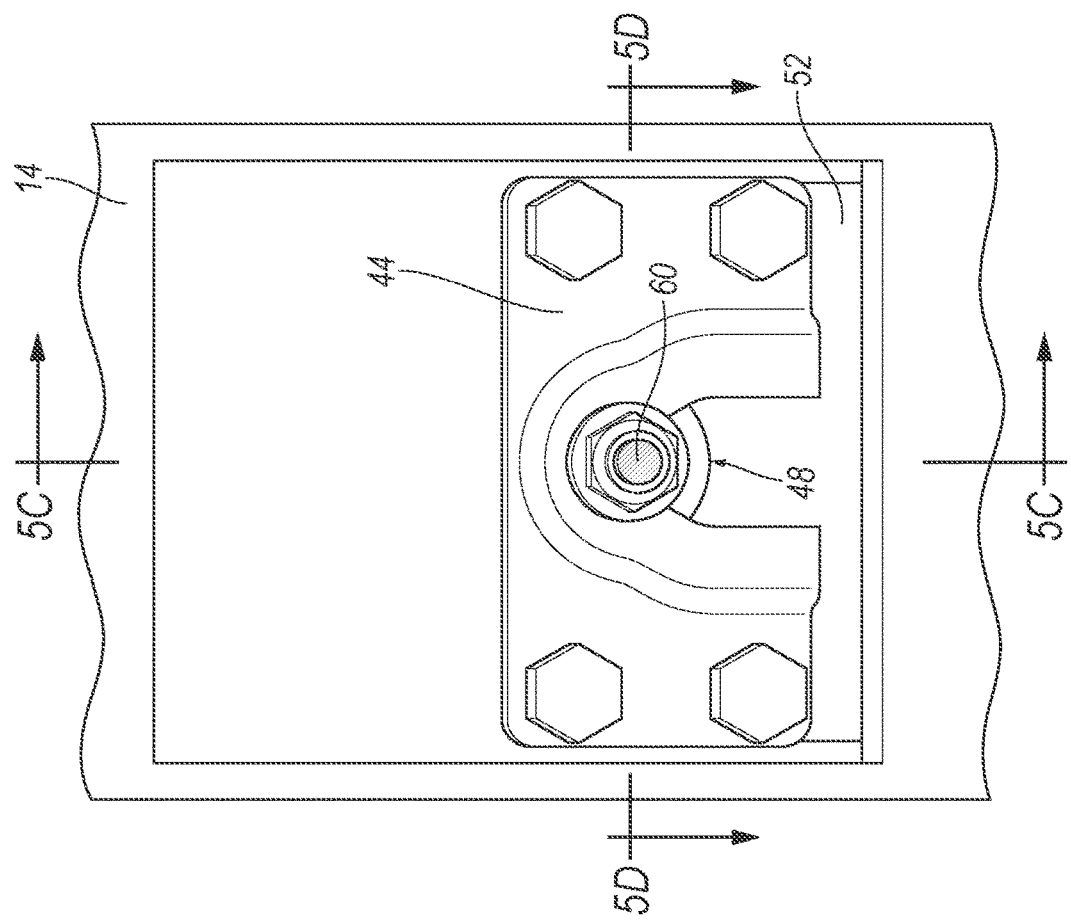
FIG. 4B is a side view of the first example of the female portion of the first locking member in the lowered position and the male portion of the second locking member in the extended position.
Figure 4A:
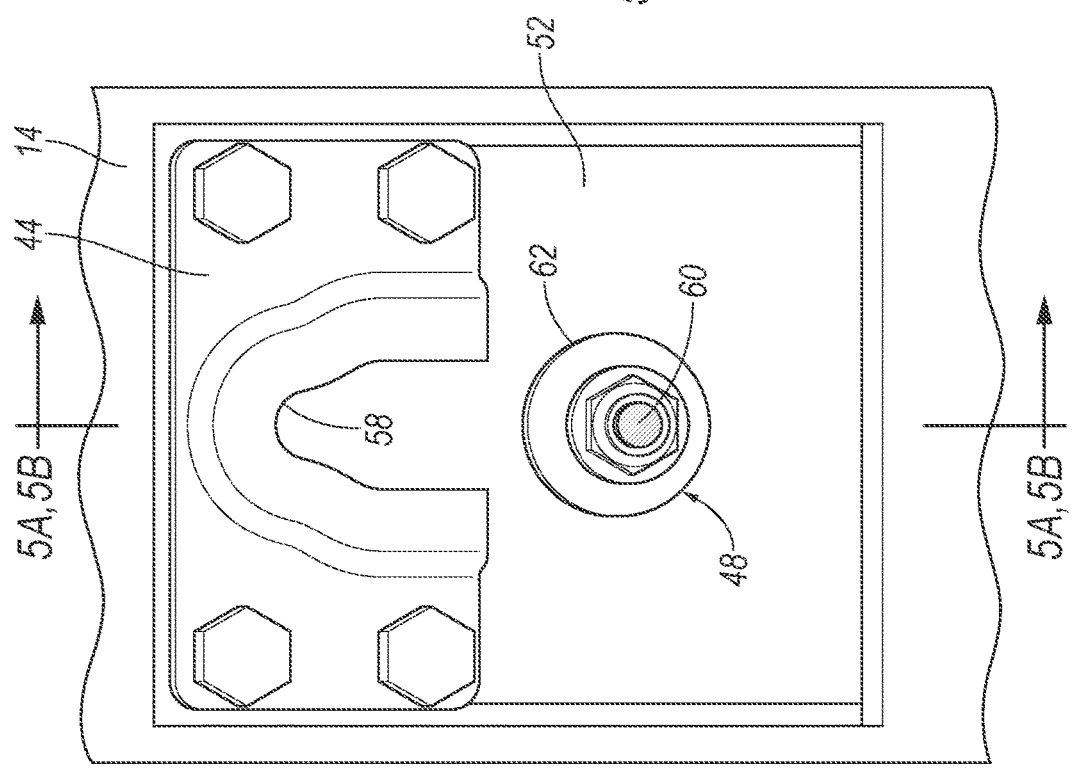
FIG. 4A is a side view of a first example of the female portion of the first locking member in the raised position and a male portion of the second locking member in the retracted position.
Figure 5A:
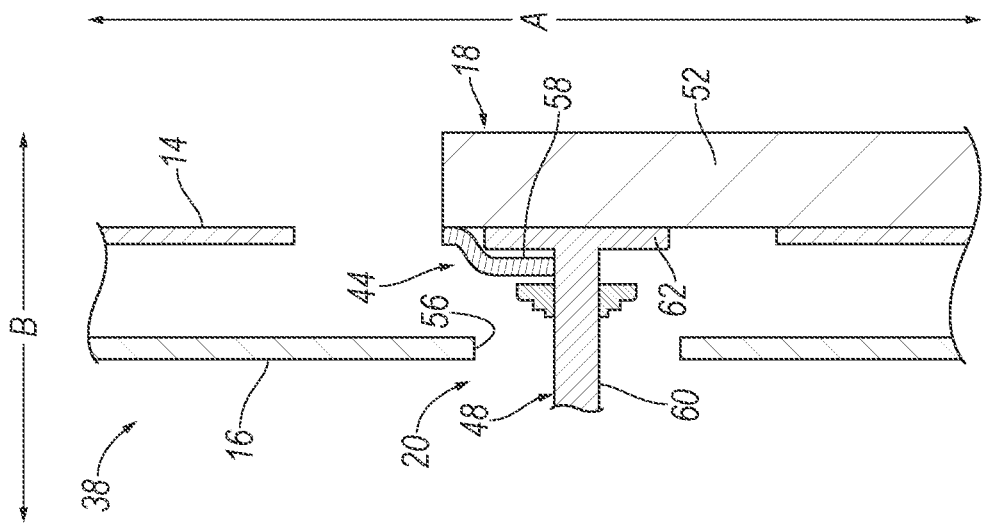
FIG. 5A is a cross-sectional view of the first example of the female portion of the first locking member in the raised position and the male portion of the second locking mechanism in the retracted position through line 5A of FIG. 4A.
Figure 5B:
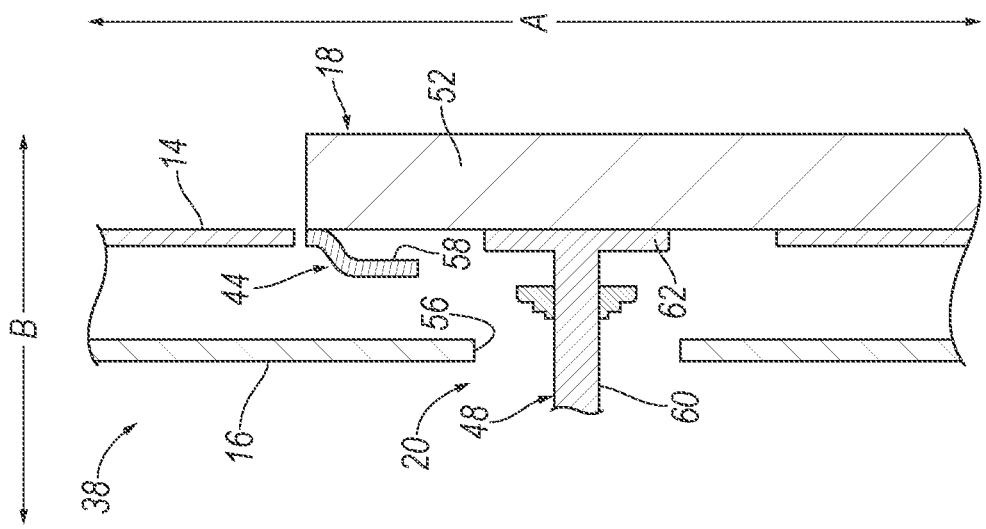
FIG. 5B is a cross-sectional view of the first example of the female portion of the first locking member in the raised position and the male portion of the second locking mechanism in the extended position through line 5B of FIG. 4A.
Figure 5C:
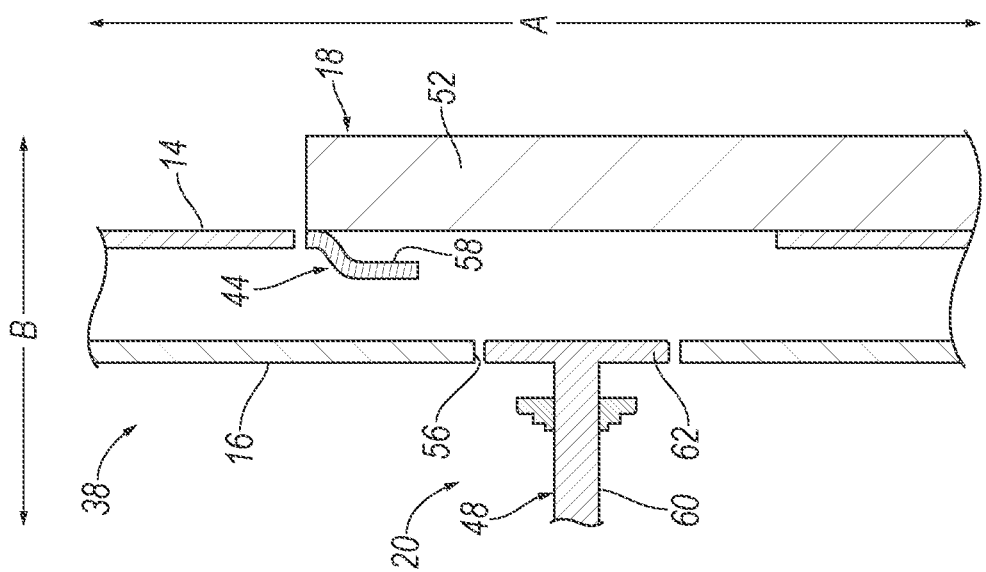
FIG. 5C is a cross-sectional view of the first example of the female portion of the first locking member in the lowered position and the male portion of the second locking mechanism in the extended position through line 5C of FIG. 4B.
Figure 5D:
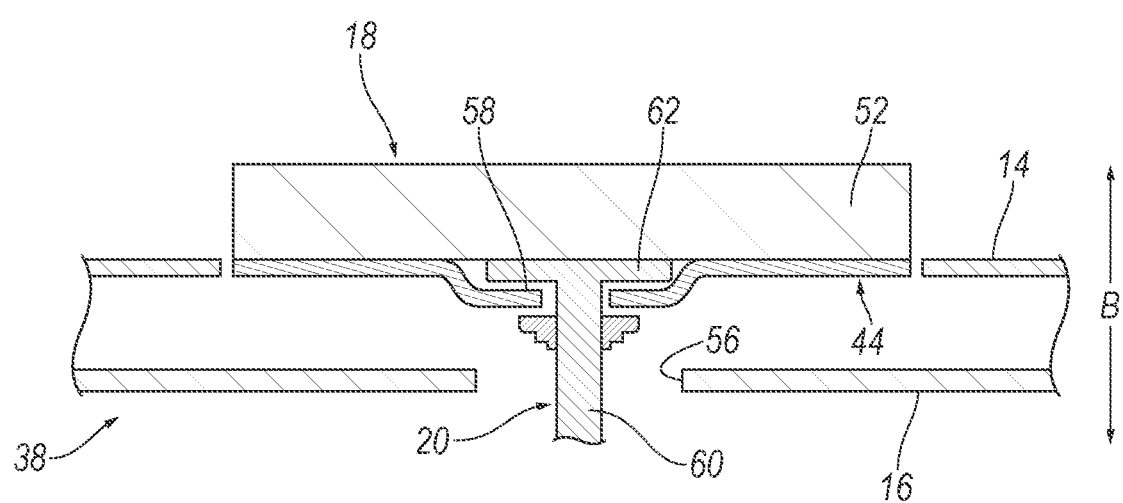
FIG. 5D is a cross-sectional view of the first example of the female portion of the first locking member in the lowered position and the male portion of the second locking mechanism in the extended position through line 5D of FIG. 4B.
Figure 6A:
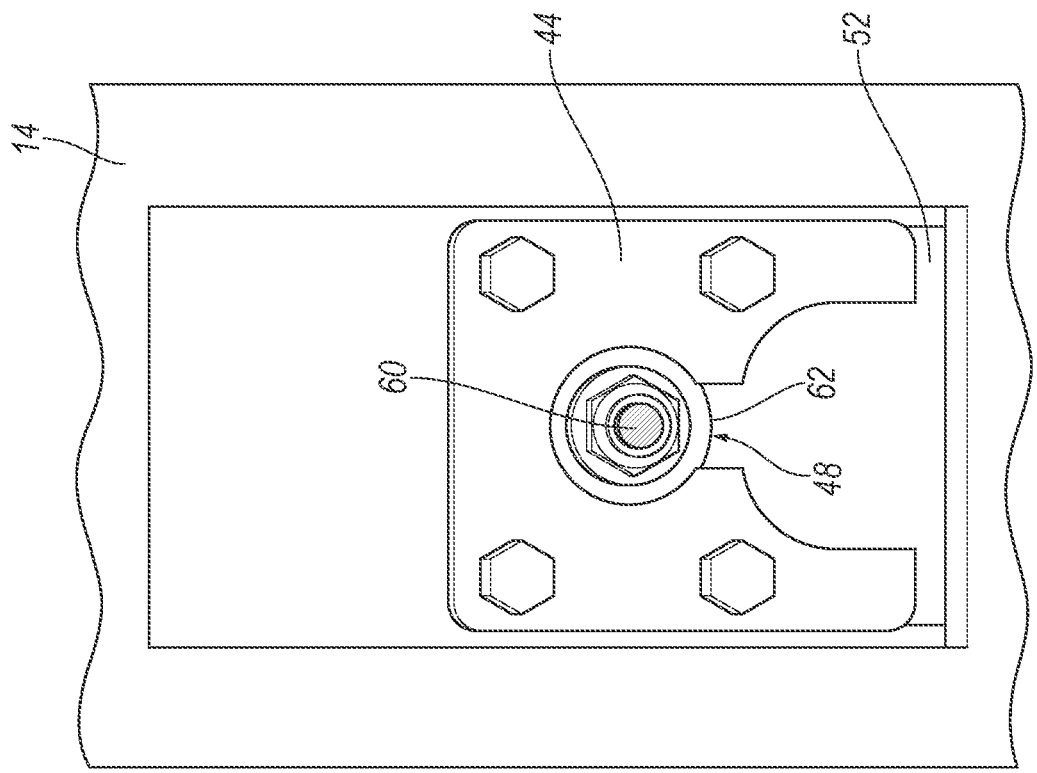
FIG. 6A is a side view of a second example of the female portion of the first locking member in the raised position and a male portion of the second locking member in the retracted position.
Figure 6B:
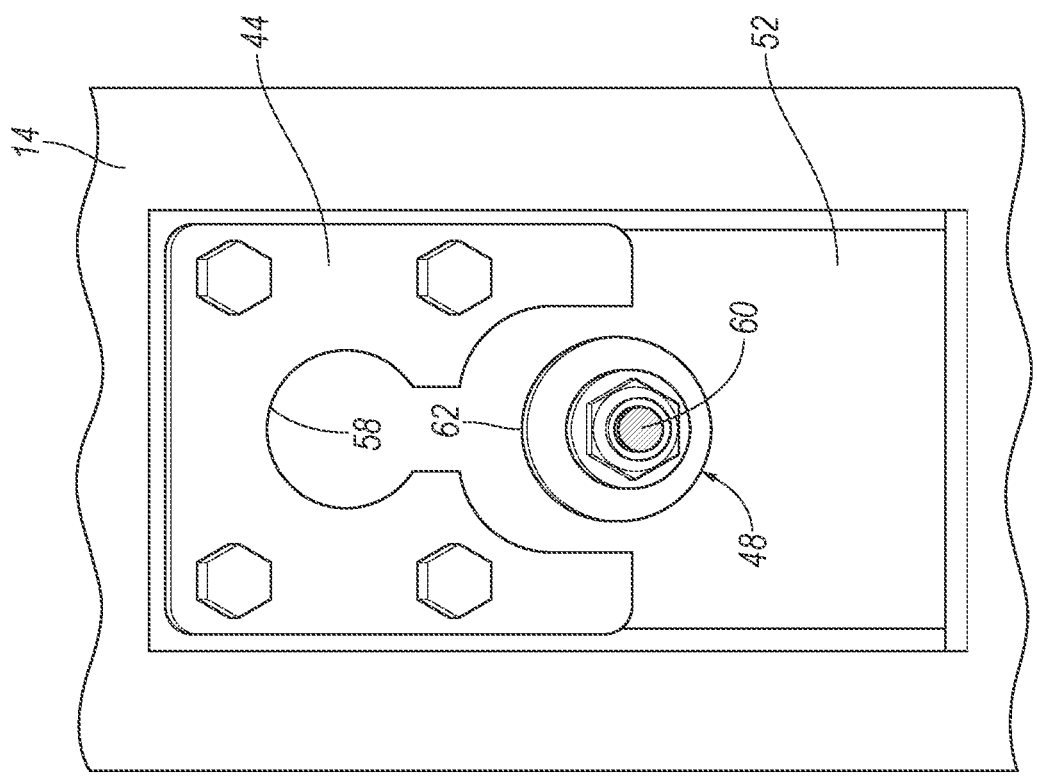
FIG. 6B is a side view of the second example of the female portion of the first locking member in the lowered position and the male portion of the second locking member in the extended position.

As shown in FIGS. 3A and 3B, the second locking member 20 is movable from a retracted position to an extended position. The second locking member 20 is lockingly engaged with the first locking member 18 when the second locking member 20 is in the extended position and the second locking member 20 is disengaged with the first locking member 18 when the second locking member 20 is in the retracted position. Specifically, the first locking member 18 is lockingly engaged with the second locking member 20 when the second locking member 20 is in the extended position and the first locking member 18 is in one of the lowered position or the raised position and the first member is disengaged with the second locking member 20 when the second locking member 20 is in the retracted position and the first locking member 18 is in the other of the lowered position or the raised position. As discussed above, in the example shown in the Figures, the first locking member 18 lockingly engaged with the second locking member 20 when the first locking member 18 is in the lowered position and the second locking member 20 is in the extended position and the first locking member 18 is disengaged with the second locking member 20 when the first locking member 18 is in the raised position and the second locking member 20 is in the retracted position.

The second locking member 20 is movable relative to the second door 16 along the second axis B transverse to the first axis A. The second axis B may extend along the vehicle-longitudinal axis L. As an example, the second axis B may be generally horizontal.

With reference to FIGS. 1-3B, the assembly 10 includes a first motor 40 operatively connected to the first locking member 18 such that the first locking member 18 moves between the lowered position and the raised position. Upon actuation of the first motor 40, the first motor 40 operates to move the first locking member 18 from the lowered position to the raised position or from the raised position to the lowered position, depending on the position of the doors 14, 16. The assembly 10 includes a second motor 42 operatively connected to the second locking member 20 such that the second locking member 20 moves between the retracted position and the extended position. Upon actuation of the second motor 42, the second motor 42 operates to move the second locking member 20 from the retracted position to the extended position or from the extended position to the retracted position. The motors 40, 42 move the locking members 18, 20 to lockingly engage the locking members 18, 20 together.

As shown in FIGS. 4A, 4B, 6A, and 6B, the first locking member 18 includes a first female portion 44 and a second female portion 46 spaced along the first door 14 from the first female portion 44. The first female portion 44 may be spaced upwardly from the second female portion 46 along the first axis A. The first female portion 44 may be spaced upwardly from the midlines M of the first door 14 and the second door 16 and the second female portion 46 may be spaced downwardly from the midlines M of the first door 14 and the second door 16. The first female portion 44 and the second female portion 46 may be identical to each other. The examples shown in FIGS. 4A, 4B, 6A, and 6B apply to both the first female portion 44 and the second female portion 46.

The first female portion 44 and the second female portion 46 move from the raised position to the lowered position along the first axis A. The first female portion 44 may be coupled to the second female portion 46 to move the female portions 44, 46 together as a unit. For example, as shown in the Figures, the first locking member 18 may include a first rod 52 elongated along the first axis A. The first rod 52 is moveably supported by the first door 54, e.g., slidably engaged with the slots, brackets, etc., of the first door. The first rod 52 may be, for example, between the door inner and the door outer of the first door 14. The first female portion 44 and the second female portion 46 may be fixed to the first rod 52. The female portions 44, 46 may be spaced along the first rod 52 along the first axis A. The first rod 52, first female portion 44, and the second female portion 46 may move as a unit from the raised position and the lowered position. The first rod 52 may have any suitable shape and any suitable cross-section, e.g., round, rectangular, etc.

With continued reference to FIGS. 4A, 4B, 6A, and 6B, the second locking member 20 may include a first male portion 48 and a second male portion 50 spaced from the first male portion 48 along the first axis A. The first male portion 48 may be spaced upwardly from the second male portion 50 along the first axis A. The first male portion 48 may be spaced upwardly from the midlines M of the first door 14 and the second door 16 and the second male portion 50 may be spaced downwardly from the midlines M of the first door 14 and the second door 16.

The first male portion 48 and the second male portion 50 move from the retracted position to the extended position along the second axis B that is transverse to the first axis A. The first male portion 48 may be coupled to the second male portion 50 to move the male portions 48, 50 together as a unit. For example, as shown in the Figures, the second locking member 20 may include a second rod 54 elongated along the first axis A. The second rod 54 may be supported by the second door 16 between the door inner and the door outer of the second door 16. The first male portion 48 and the second male portion 50 may be fixed to the second rod 54. The male portions 48, 50 may be spaced along the second rod 54 along the first axis A. The second rod 54, the first male portion 48, and the second male portion 50 may move as a unit from the retracted position to the extended position.

In the retracted position, the male portions 48, 50 may be recessed into the second door 16 and concealed within the second door 16. In the extended position, the male portions 48, 50 may protrude from the second door 16 along the second axis B toward the first door 14. For example, as shown in the Figures, the male portions 48, 50 may extend through holes 56 defined by the first door 14 when in the extended position.

The first female portion 44 is aligned with the first male portion 48 and the second female portion 46 is aligned with the second male portion 50. Because the first female portion 44 is aligned with the first male portion 48, the first female portion 44 lockingly engages with the first male portion 48 when the second locking member 20 is in the extended position and the first locking member 18 is in the one of the lowered position or the raised position and the first female portion 44 disengages with the first male portion 48 when the second locking member 20 is in the retracted position and the first locking member 18 is in the other of the lowered position or the raised position. Because the second female portion 46 is aligned with the second male portion 50, the second female portion 46 lockingly engages with the second male portion 50 when the second locking member 20 is in the extended position and the first locking member 18 is in the one of the lowered position or the raised position and the second female portion 46 disengages with the second male portion 50 when the second locking member 20 is in the retracted position and the first locking member 18 is in the other of the lowered position or the raised position.

As shown in the examples in FIGS. 4A, 4B, 6A, and 6B, the female portions 44, 46 may include a hook 58 extending from the second door 16. In the example shown in FIGS. 4A and 4B, the hook 58 of the female portions 44, 46 may be elongated along the second door 16 along the first axis A. In the example shown in FIGS. 6A and 6B, the hook 58 of the female portions 44, 46 may be elongated along the second door 16 along the first axis A and may be circular. The male portions 48, 50 may include a post 60 extending from the second rod 54 and through the hole 56 in the second door 16. The male portions 48, 50 may include a flange 62 extending circumferentially around the post 60 at an end of the post 60. The flanges 62 of the male portions 48, 50 lockingly engages with the hook 58 of the female portions 44, 46 when the doors 14, 16 are in the closed position. The flanges 62 overlap the hooks 58 of the female portions 44, 46 when the doors 14, 16 are in the closed position to lockingly engage the first locking member 18 to the second locking member 20.

As the doors 14, 16 move to the closed position, the second motor 42 operatively connected to the second locking member 20 moves the male portions 48, 50 from the retracted position to the extended position. Once the doors 14, 16 reach the closed position and the male portions 48, 50 are in the extended position, the first motor 40 operatively connected to the first locking member 18 moves the female portions 44, 46 from one of the lowered position or the raised position. In the example shown in the Figures, the female portions 44, 46 move from the raised position to the lowered position when the doors 14, 16 are in the closed position. The hook 58 of the female portions 44, 46 overlaps the flange 62 of the male portions 48, 50 to lockingly engage the first locking member 18 with the second locking member 20.

When the doors 14, 16 are to move to the open position, the female portions 44, 46 move from the one of the lowered position or the raised position to the other of the lowered position or the raised position to disengage with the male portions 48, 50. The hook 58 of the female portion moves to disengage with the flange 62 of the male portions 48, 50. In the example shown in the Figures, the female portions 44, 46 move from the lowered position to the raised position to disengage the male portions 48, 50. Once the female portions 44, 46 have disengaged with the male portions 48, 50, the male portions 48, 50 move from the extended portion to the retracted portion and the doors 14, 16 move from the closed position to the open position.

The numerical adverbs "first" and "second" with respect to the locking members 18, 20, the male portions 48, 50, and female portions 44, 46 are used herein merely as identifiers and do not signify order or importance. The terms "first" and second" may be used interchangeably when referring to the locking members 18, 20, the male portions 48, 50, and female portions 44, 46 as shown in the Figures.

The vehicle 12 may include one or more door motors 64. The door motors 64 may be connected to one or more of the doors 14, 16, e.g., through the track along which the doors 14, 16 slide, to move the doors 14, 16 between the closed position and the open position. In some examples, the vehicle 12 may allow an occupant input, e.g., a button, screen option, etc., to open the doors 14, 16. In such an example, when an occupant activates the input, the door motors 64 may be activated, and the doors 14, 16 may move to the open position or to the closed position. In other examples, the doors 14, 16 may move automatically to the open position or closed position based on other inputs from the vehicle 12, e.g., when the vehicle 12 is parked, in motion, arrived at a planned destination, etc.

The vehicle 12 may include one or more door position sensors 66 coupled to the door motors 64. The door position sensors 66 may indicate whether the doors 14, 16 are in the open position or the closed position. The door position sensors 66 may be in communication with a computer 68 of the vehicle 12. The door position sensors 66 may send a signal to the computer 68 to indicate whether the doors 14, 16 are in the open position or the closed position. The vehicle 12 may include any suitable number of door position sensors 66 to determine the orientation of the doors 14, 16. In other words, the vehicle 12 may include a number of door position sensors 66 equal to the number of doors 14, 16 of the vehicle 12.

Figure 7:
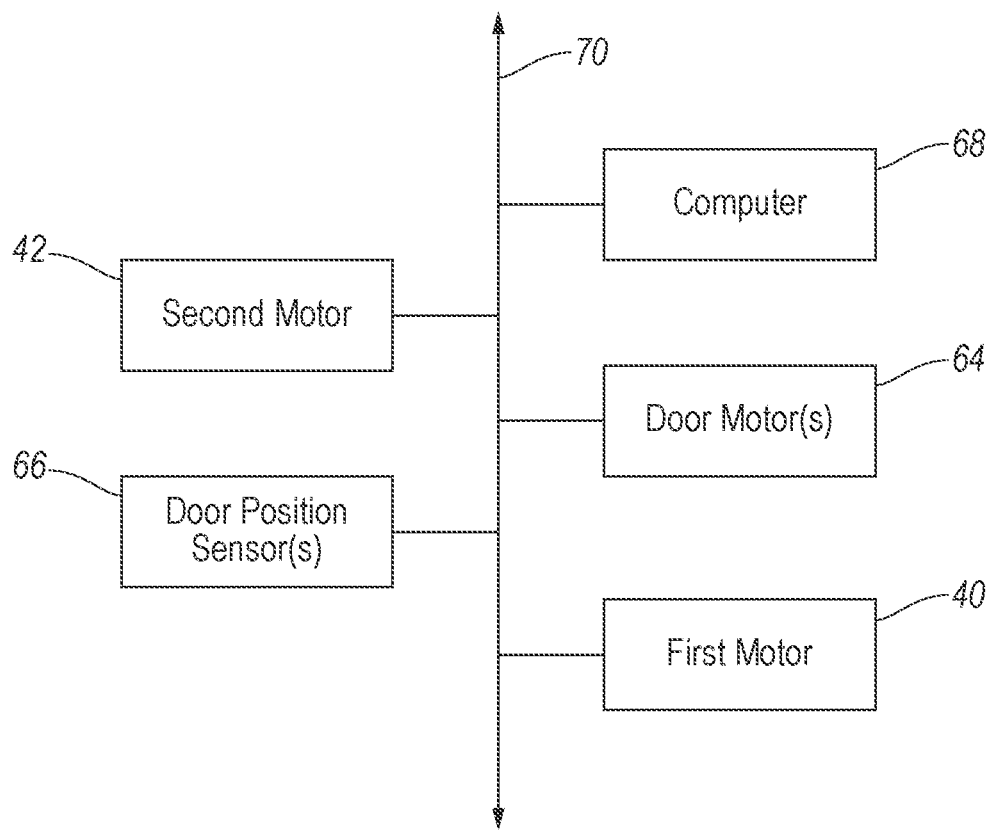
FIG. 7 is a block diagram of a vehicle communication network of the vehicle.

As shown in FIG. 7, the computer 68 includes a processor and a memory. The memory includes one or more forms of computer readable media, and stores instructions executable by the computer 68 for performing various operations, including as disclosed herein. For example, the computer 68 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, computer 68 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 68. The memory can be of any type, e.g., hard disk drives, solid state drives, servers, or any volatile or non-volatile media. The memory can store the collected data sent from the sensors.

The memory can be a separate device from the computer 68, and the computer 68 can retrieve information stored by the memory via a network in the vehicle 12, e.g., over a CAN bus, a wireless network, etc. Alternatively or additionally, the memory can be part of the computer 68, e.g., as a memory of the computer 68. The computer 68 may include programming to operate one or more of vehicle brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 68, as opposed to a human operator, is to control such operations. Additionally, the computer 68 may be programmed to determine whether and when a human operator is to control such operations. The computer 68 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc. The computer 68 is generally arranged for communications on a vehicle communication network 70 that can include a bus in the vehicle 12 such as a controller area network CAN or the like, and/or other wired and/or wireless mechanisms. Alternatively or additionally, in cases where the computer 68 actually comprises a plurality of devices, the vehicle communication network 70 may be used for communications between devices represented as the computer 68 in this disclosure. Further, as mentioned below, various controllers and/or sensors may provide data to the computer 68 via the vehicle communication network 70.

Figure 8:
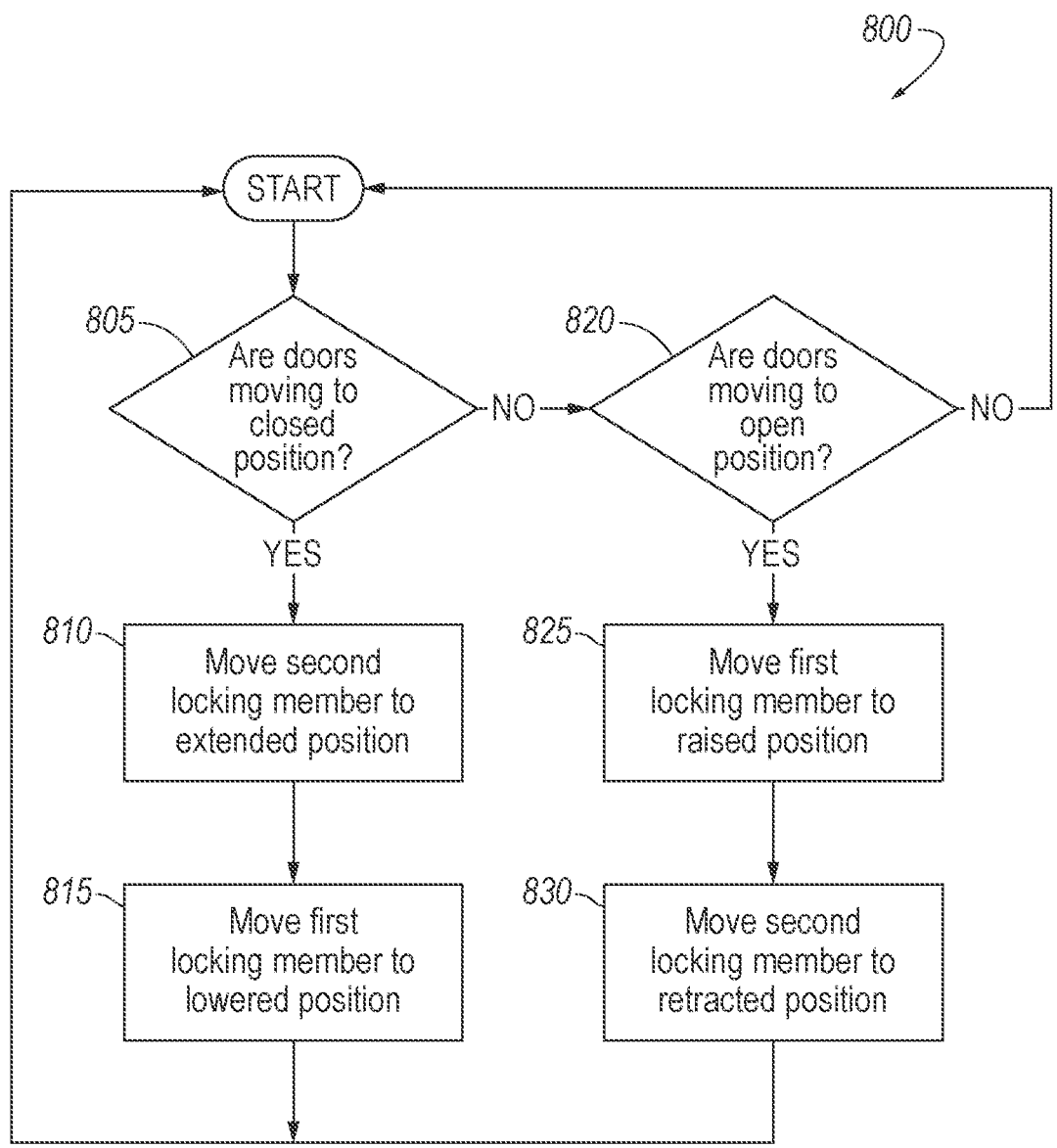
FIG. 8 is a flow chart of a method for moving the first locking member from the raised position to the lowered position and the second locking member from the retracted position to the extended position.

With reference to FIG. 8, the computer 68 stores instructions to control components of the vehicle 12 according to the method 800 shown in FIG. 8. Specifically, the method 800 controls the first locking member 18 and the second locking member 20 based on the position of the doors 14, 16. Use of "in response to," "based on," and "upon determining" herein, including with reference to method 800, indicates a causal relationship, not merely a temporal relationship.

With reference to decision block 805, the method includes identifying whether to move the doors 14, 16 to the closed position based on information from the door position sensors 66. Such information may include an input from a passenger of the vehicle 12 to move the doors 14, 16 to the closed position, e.g., by pushing a button in the vehicle 12, or by other inputs from the vehicle 12. The door position sensor 66 may send a signal to the computer 68 to move the doors 14, 16 to the closed position based on the information provided by the door position sensors 66. If the doors 14, 16 are not moved to the closed position, the method moves to decision block 820, as described further below.

With reference to block 810, based on identifying the doors 14, 16 are moving to the closed position, the second locking member 20 moves from the retracted position to the extended position. The computer 68 may send a signal to the second motor 42 coupled to the second locking member 20 to move the second locking member 20 from the retracted position to the extended position.

With reference to block 815, the method includes moving the first locking member 18 from the raised position to the lowered position to lockingly engage the first locking member 18 with the second locking member 20. The computer 68 may send a signal to the first motor 40 to move the first locking member 18 from the raised position to the lowered position, as shown in the example in the Figures. The method then starts from the beginning to identify if the doors 14, 16 are to be moved to the closed position.

With reference to block 820, if the doors 14, 16 are identified as not moving to the closed position, the method includes identifying whether to move the doors 14, 16 to the open position based on information from the door position sensors 66. Such information may include an input from a passenger of the vehicle 12 to move the doors 14, 16 to the open position, e.g., by pushing a button in the vehicle 12, or by other inputs from the vehicle 12. The door position sensor 66 may send a signal to the computer 68 to move the doors 14, 16 to the open position based on the information provided by the door position sensors 66. If the doors 14, 16 are not moved to the open position, the method may start again at the beginning.

With reference to block 825, upon identifying that the doors 14, 16 are moving to the open position, the method includes moving the first locking member 18 from the lowered position to the raised position to disengage the first locking member 18 from the second locking member 20. The computer 68 may send a signal to the first motor 40 to move the first locking member 18.

With reference to block 830, the method includes moving the second locking member 20 from the extended position to the retracted position. The computer 68 may send a signal to the second motor 42 to move the second locking member 20. The method returns to the beginning to begin identifying the position of the doors 14, 16 based on the door position sensor 66.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a first door and a second door moveable relative to each other from an open position to a closed position;
a first locking member supported by the first door, the first locking member being moveable relative to the first door along a first axis in an upward direction to a raised position and in a downward direction relative to the first door to a lowered position; and
a second locking member supported by the second door, the second locking member being movable relative to the second door along a second axis transverse to the first axis from a retracted position to an extended position;
the first locking member being lockingly engaged with the second locking member when the second locking member is in the extended position and the first locking member is in one of the lowered position or the raised position, the first locking member being disengaged with the second locking member when the second locking member is in the retracted position and the first locking member is in the other of the lowered position or the raised position.

2. The assembly of claim 1, wherein:
the first locking member includes a first female portion;
the second locking member includes a first male portion; and
the first female portion being lockingly engaged with the first male portion when the second locking member is in the extended position and the first locking member is in the one of the lowered position or the raised position, the first female portion being disengaged with the first male portion when the second locking member is in the retracted position and the first locking member is in the other of the lowered position or the raised position.

3. The assembly of claim 2, wherein:
the first locking member includes a second female portion spaced from the first female portion along the first axis;
the second locking member includes a second male portion spaced from the male portion along the first axis; and
the second female portion being lockingly engaged with the second male portion when the second locking member is in the extended position and the first locking member is in the one of the lowered position or the raised position, the second female portion being disengaged with the second male portion when the second locking member is in the retracted position and the first locking member is in the other of the lowered position or the raised position.

4. The assembly of claim 3, wherein the first female portion and the second female portion move together as a unit.

5. The assembly of claim 4, wherein the first male portion and the second male portion move together as a unit.

6. The assembly of claim 3, wherein the first door and the second door each define a midline extending along a vehicle-longitudinal axis, the first female portion being spaced upwardly from the midlines of the first door and the second door and the second female portion being spaced downwardly from the midlines of the first door and the second door.

7. The assembly of claim 3, wherein the first locking member includes a rod elongated along the first axis, the first female portion and the second female portion being fixed to the rod of the first locking member.

8. The assembly of claim 7, wherein the second locking member includes a rod elongated along the first axis, the first male portion and the second male portion being fixed to the rod of the second locking member.

9. The assembly of claim 1, wherein the first locking member includes a female portion and the second locking member includes a male portion, the female portion and the male portion being lockingly engaged when the second locking member is in the extended position and the first locking member is in the one of the lowered position or the raised position, the female portion and the male portion being disengaged when the second locking member is in the retracted position and the first locking member is in the other of the lowered position or the raised position.

10. The assembly of claim 1, wherein the first door and the second door are slidable between the open position and the closed position.

11. The assembly of claim 1, wherein the first locking member and the second locking member are spaced from each other along a vehicle-longitudinal axis when the first door and the second door are in the open position and the first locking member and the second locking member are adjacent each other when the first door and the second door are in the closed position.

12. The assembly of claim 1, wherein the first axis is generally vertical and the second axis is generally horizontal.

13. The assembly of claim 1, further comprising:
a first motor operatively connected to the first locking member to move the first locking member between the lowered position and the raised position; and a second motor operatively connected to the second locking member to move the second locking member between the retracted position and the extended position.

* * * * *